July 14, 1931.  W. C. FERGUSON  1,814,678
METHOD OF JOINING BELL AND SPIGOT PIPES
Filed Aug. 4, 1927
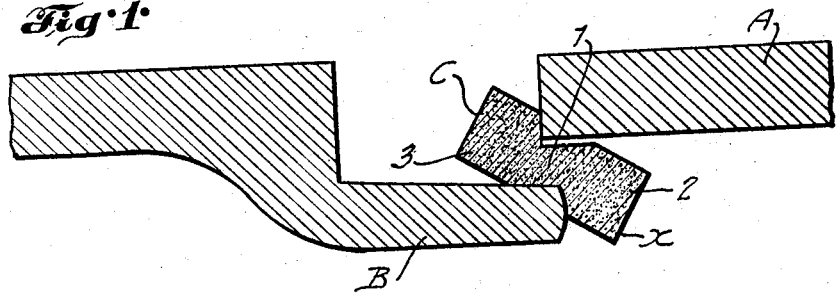
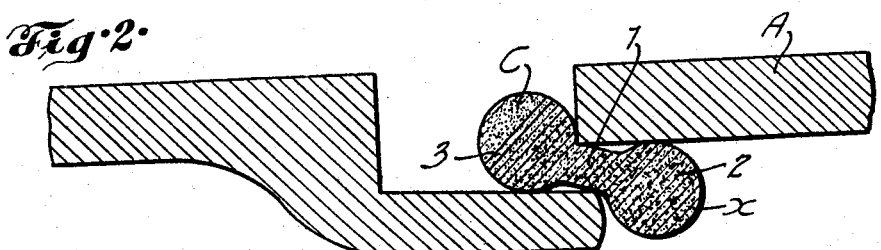
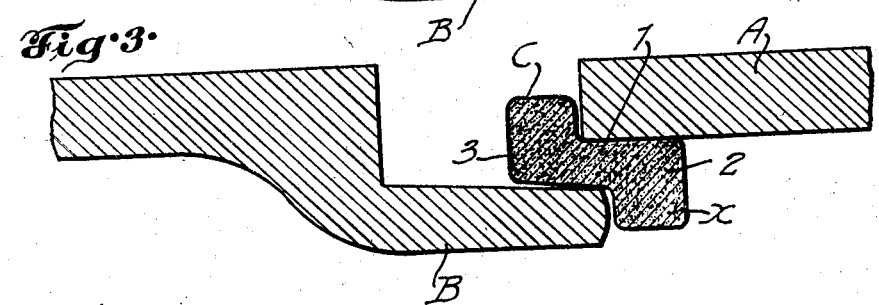
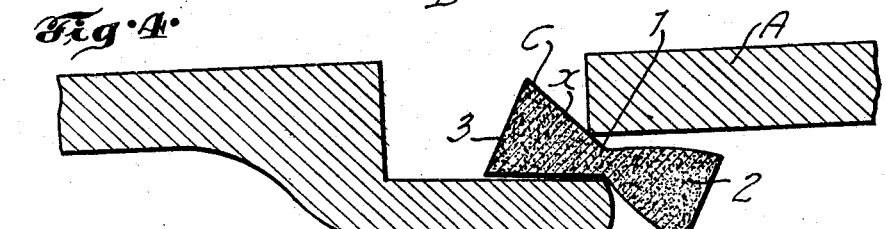
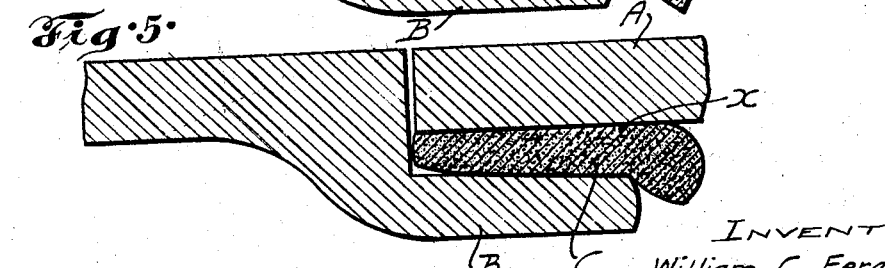
INVENTOR
William C. Ferguson.
By Bakewell & Churchill
ATTORNEYS Patented July 14, 1931

1,814,678

UNITED STATES PATENT OFFICE

WILLIAM C. FERGUSON, OF ST. LOUIS, MISSOURI

METHODS OF JOINING BELL AND SPIGOT PIPES

Application filed August 4, 1927. Serial No. 210,699.

This invention relates to joints for conventional sewer pipe and water pipe of the type that comprise a plain faced, cylindrical spigot that is adapted to be forced into a plain faced bell or cylindrical flange.

One object of my invention is to provide a novel method of joining conventional bell and spigot pipe which makes it possible to obtain absolutely tight joints between the spigots and bells of such pipe, even though there is considerable variation in the size of the pipe and even though the spigot of one pipe or the co-operating bell of the other pipe is substantially elliptical shaped or considerably out of round.

Another object of my invention is to provide a novel method of joining bell and spigot pipe by which tight joints can be produced between plain-faced spigots and bells without liability of breaking or cracking the bells, due to excessive pressure exerted on the bells by the packing material which is forced into the annular space between a spigot and its co-operating bell.

Another object is to provide a method by which a relatively stiff, deformable gasket or pipe jointing element can be installed quickly and easily between a conventional pipe spigot and a conventional pipe bell so as to produce a tight joint between said parts. Other objects and desirable features of my invention will be hereinafter pointed out.

To this end I have devised a method of joining conventional bell and spigot pipe of the kind in which the spigot consists of a plain-faced, cylindrical member and the bell consists of a plain-faced, annular flange, that contemplates rolling a deformable packing material, preferably a pre-formed element constructed of a plastic substance, into operative position between the bell and its cooperating spigot by causing one of said parts to exert longitudinal pressure on a portion of the jointing element while a different portion of the jointing element is held against longitudinal movement. The jointing element can be arranged on the end of the spigot and the spigot thereafter moved longitudinally in a direction to cause the element to contact with the front edge of the bell and be rolled inwardly into the bell by the inward longitudinal pressure which the spigot exerts on the inner side of the element while the outer side of said element is held against longitudinal movement by contacting with the bell; the jointing element can be arranged at the front end of the bell or inside of the bell at a point in advance of the rear end wall of the bell, and then rolled inwardly over the inner surface of the bell by the pressure which the spigot exerts on said element during the operation of forcing the spigot home; or the spigot can be held at rest and the bell moved longitudinally over the spigot after the jointing element has been positioned between the end of the spigot and the front end of the bell in such a way as to obtain the result above described.

The gasket or pipe jointing element that is used in practising my method is provided with a body portion formed either from a plastic or semi-plastic substance that will not disintegrate or pull apart during the operation of rolling it into the bell, or formed from a deformable core, surrounded by a fabric casing. If desired, the jointing element can be provided with an adhesive outer coating so as to cause it to adhere tightly to the pipe with which it is used.

The particular cross-sectional shape of the jointing element is also immaterial, but it is preferable to use a jointing element provided with a reduced central portion that lies between the inner surface of the bell and the outer surface of the spigot at the beginning of the operation of forcing the spigot longitudinally into the bell, as a jointing element of such cross-sectional shape comprises a surface or portion at its inner side that laps over or contacts with the front end of the spigot, and a portion at its outer side that contacts with the front edge of the bell and which is arranged on the outside of the bell. During the operation of producing relative longitudinal movement between the spigot and the bell, the surface or portion at the inner side the jointing element that contacts with the end of the spigot virtually acts as an abutment on the element that insures the inner portion of the element moving longitudinally with the spigot, and the portion at the outer side of the element that contacts with the front edge of the bell acts not only as an abutment on the element that prevents the outer side of the element from moving longitudinally with the spigot, but also constitutes a reserve supply of packing material, more or less of which will be rolled into operative position between the inner surface of the bell and the outer surface of the spigot, depending upon the size of the annular space between the spigot and bell. Accordingly, even though there is considerable variation in the size of the pipe and even though the bell or its co-operating spigot is substantially elliptical-shaped or considerably out of round, the packing material will automatically adjust itself to the size and shape of the space between the spigot and bell, and thus insure a tight joint between said parts. Moreover, as the amount or quantity of the packing material which is rolled into the space between the spigot and bell is only just enough to fill said space sufficiently to produce a tight joint between the bell and spigot, there is no danger of cracking the bell, due to forcing so much packing material between the bell and spigot that the bell is subjected to an excessive strain.

While the preferred form of gasket or jointing element is one provided at its inner and outer sides with portions that contact with or lap over the front end of the spigot and the front edge of the bell, respectively, at the beginning of the operation of installing the element, I wish it to be understood that relative longitudinal movement between the spigot and the portion of the jointing element with which it contacts, or relative longitudinal movement between the bell and the portion of the jointing element with which it contacts could be prevented in other ways, as, for example, by using an adhesive outer coating on the jointing element to anchor it to said parts. The principal thing, so far as my present invention is concerned, is that the jointing element be of such shape and composition that when it is used with a conventional plain-faced spigot and bell, the outer side of the jointing element will be anchored to the bell and the inner side of the jointing element will be anchored to the spigot, during the operation of forcing the spigot home, thereby causing the jointing element to be subjected to an action like that produced when a body of material is rolled out between two moving surfaces, such action causing the jointing element to be spread out over the inner surface of the bell to a depth that varies according to the size and shape of the space between the spigot and bell, notwithstanding the fact that the opposed surfaces of the spigot and bell are not provided with annular grooves, ribs or other gripping surfaces of special form.

Figures 1, 2, 3 and 4 of the drawings illustrate various shapes of gaskets or pipe jointing elements that can be used in practising my improved method of joining bell and spigot pipe, each of said views showing the jointing element in cross section and the bell and spigot in longitudinal section and arranged in engagement with the jointing element at the beginning of the operation of forcing the spigot home, i. e., into the bell; and Figure 5 is a longitudinal sectional view, illustrating the jointing element rolled into its operative position between the bell and spigot.

In the drawings, A designates a pipe spigot, B designates a co-operating pipe bell and C designates a gasket or jointing element that is used to produce a tight joint between said bell and spigot. Said jointing element consists either of an annular member or a member of strip form that is capable of being bent into annular shape. It is preferably provided with a body portion formed of a plastic or semi-plastic, water-proof substance of such consistency that it can be rolled into the bell, but which is of such composition or construction that it will not disintegrate or pull apart during said operation; or it can be composed of a plastic core preferably constructed of an asphaltic substance and surrounded by a fabric casing so as to produce a water-proof, deformable jointing element of the kind described in my said pending application for patent, that has sufficient stiffness to effectually resist the possibility of its squashing down when subjected to the weight or load of the earth that is used to cover the pipe with which it is used. If desired, the jointing element C can be provided with an adhesive outer coating, designated by the reference character $x$, that is used to secure the element to the pipe and produce a tight joint between said element and the surfaces of the bell and spigot against which it bears.

The cross-sectional shape of the jointing element is also immaterial, but it is preferable to use a jointing element that has a reduced central portion 1, so that when the element is arranged in engagement with the spigot and bell at the beginning of the operation of forcing the spigot endwise into the bell, said reduced central portion 1 will be located between the inner surface of the bell and the outer surface of the spigot, the portion 2 at the front end of the element will be positioned on the outside of the bell in contact with the front edge of same, and the portion 3 at the rear end of the element will be arranged on the inside of the bell in contact with the front end of the spigot. During the operation of forcing the spigot home, the inner side of the jointing element that contacts with the end of the spigot will move longitudinally with the spigot into the bell and the outer side of the element that contacts with the front edge of the bell will be held against longitudinal movement, thereby causing the element to be rolled into the bell, as shown in Figure 5 by the pressure which the spigot exerts on said element in opposition to the force or thrust the bell exerts on the outer side of said element. Such a method of installing a deformable pipe jointing element between a pipe bell and spigot not only makes it possible to easily install a relatively stiff jointing element, i. e., one that will not be apt to squash down when the pipe are subjected to the weight of the earth used to cover the same, but it insures tight joints between pipe that vary considerably in size and also irregular pipe that are substantially elliptical-shaped or considerably out of round, due to the fact that the front end portion of the element C that contacts with the front edge of the bell B constitutes a supply of packing material, more or less of which is rolled into the annular space between the bell and spigot, depending upon the shape and size of said annular space. Moreover, such a method overcomes the necessity of keeping on hand a large number of shapes and sizes of gaskets or jointing elements, due, of course, to the fact that the method insures only enough packing material being rolled into the space between the bell and spigot to properly fill said space, the excess packing material remaining on the outside of the bell. As previously stated, the jointing element can either be arranged on the end of the spigot, or it can be arranged inside of the bell at the extreme end of the bell, or at a point in advance of the rear end wall of the bell.

While the jointing elements C shown in Figures 1 to 4 vary in cross-sectional shape, it will be seen that each of said jointing elements has a reduced central portion 1 that is arranged between the spigot and the bell at the beginning of the operation of forcing the spigot home, a front portion 2 that contacts with the front edge of the bell B and which practically forms an abutment surface on the jointing element that holds the outer side of the element against longitudinal movement during the operation of rolling the element into the bell, and a rear portion 3 that contacts with the front end of the spigot A, and thus virtually acts as an abutment surface that insures the inner side of the element moving longitudinally with the spigot. While I prefer to use a jointing element which is of such cross-sectional shape that portions on same co-operate with the front end of the spigot and with the front edge of the bell to anchor the inner side of the element to the spigot and to anchor the outer side of the element to the bell, relative longitudinal movement between the outer side of the element and the bell and relative longitudinal movement between the inner side of the element and the spigot can be prevented in other ways.

I make no claim herein to the jointing element per se, that is used in my method, as I have covered in my U. S. Patent No. 1,662,603, dated March 13, 1928, and in my pending application for U. S. Patent Serial No. 248,815, filed January 23, 1928, various forms of jointing elements that may be used in practising my method.

Having thus described my invention, what I claim as new and desire to secure by Letters Patent is:

A method of joining bell and spigot pipe, which consists in arranging a deformable gasket between a pipe bell and a longitudinally aligned spigot in such a way that part of said gasket is positioned inside of the bell and part of said gasket is positioned on the exterior of the bell, producing relative longitudinal movement between the bell and spigot in a direction to deform the gasket and cause the spigot to enter the bell, holding a portion at the inner side of the gasket against movement relatively to the spigot during said deforming operation, and holding a portion at the outer side of the gasket against movement relatively to the bell during said deforming operation, whereby the part of the gasket originally positioned in the bell will be spread over the inner surface of the bell and more or less of the part of the gasket originally positioned on the exterior of the bell will be packed in the space between the bell and spigot.

WILLIAM C. FERGUSON.